(12) United States Patent
Klein

(10) Patent No.: US 8,888,462 B2
(45) Date of Patent: Nov. 18, 2014

(54) ROTOR BLADE OR ROTOR BLADE SEGMENT FOR A WIND TURBINE

(75) Inventor: Hendrik Klein, Rostock (DE)

(73) Assignee: Nordex Energy GmbH, Hamburg (DE)

( * ) Notice: Subject to any disclaimer, the term of this patent is extended or adjusted under 35 U.S.C. 154(b) by 588 days.

(21) Appl. No.: 13/223,438

(22) Filed: Sep. 1, 2011

(65) Prior Publication Data

US 2012/0070295 A1 Mar. 22, 2012

(30) Foreign Application Priority Data

Sep. 22, 2010 (DE) .......................... 10 2010 046 518

(51) Int. Cl.
*F03D 1/06* (2006.01)
*B23P 11/00* (2006.01)

(52) U.S. Cl.
CPC ......... *F03D 1/0658* (2013.01); *F05B 2240/302* (2013.01); *F03D 1/0675* (2013.01); *Y02E 10/721* (2013.01)
USPC ........ 416/225; 416/230; 416/239; 416/241 A; 416/248

(58) Field of Classification Search
CPC  F03D 1/0658; F03D 1/0675; F05B 2240/302
USPC ...... 416/223 R, 225, 227 R, 229 R, 230, 232, 416/234, 239, 241 A, 248; 29/889.2, 29/889.21, 889.23, 889.7, 889.71
See application file for complete search history.

(56) References Cited

U.S. PATENT DOCUMENTS

| | | | |
|---|---|---|---|
| 3,108,640 A * | 10/1963 | Scherenberg | 416/22 |
| 3,695,780 A * | 10/1972 | Velkoff | 416/189 |
| 4,095,918 A * | 6/1978 | Mouton et al. | 415/7 |
| 4,389,162 A | 6/1983 | Doellinger et al. | |
| 5,083,902 A * | 1/1992 | Rhodes | 416/132 B |
| 7,393,184 B2 | 7/2008 | Cairo | |
| 7,481,624 B2 | 1/2009 | Wobben | |
| 7,980,827 B2 * | 7/2011 | Stiesdal | 416/233 |
| 2010/0158694 A1 | 6/2010 | Stam et al. | |
| 2011/0091326 A1 | 4/2011 | Hancock | |

* cited by examiner

*Primary Examiner* — Igor Kershteyn
(74) *Attorney, Agent, or Firm* — Walter Ottesen P.A.

(57) ABSTRACT

Rotor blade or rotor blade segment for a wind turbine, having at least one cable for fixing the rotor blade or rotor blade segment to a rotor hub or to a further rotor blade segment, wherein the at least one cable is redirected in a U-shaped manner within the rotor blade or rotor blade segment.

32 Claims, 3 Drawing Sheets

ROTOR BLADE OR ROTOR BLADE SEGMENT FOR A WIND TURBINE

CROSS REFERENCE TO RELATED APPLICATION

This application claims priority of German patent application no. 10 2010 046 518.6, filed Sep. 22, 2010, the entire content of which is incorporated herein by reference.

FIELD OF THE INVENTION

The invention relates to a rotor blade or a rotor blade segment for a wind turbine which is fixed on a rotor hub or on a further rotor blade segment with a cable.

BACKGROUND OF THE INVENTION

Conventionally, the connection of a rotor blade with a rotor hub is done by threaded fastener engagement of the rotor blade with a flange of the rotor hub. For this, the rotor blade can either also have a flange through which threaded bolts are guided, or the threaded bolts can be anchored in a wall of the rotor blade, for example, by threadably engaging in a metal cylinder having a threaded bore which is received in a bore in the wall of the rotor blade which runs perpendicularly to the longitudinal direction of the threaded bolt.

Also known are rotor blades subdivided into multiple rotor blade segments. A connection between the rotor blade segments can also be achieved with threaded bolts. United States patent application publication 2010/0158694 discloses specially formed inserts which are fixedly connected to the rotor blade segment and receive the threaded bolts.

From U.S. Pat. No. 7,393,184 B2, a different modularly constructed rotor blade for a wind turbine is known. The known rotor blade is constructed "piece by piece" from a plurality of rotor blade segments, whereby steel cables are guided through the entire length of the individual rotor blade segments and are fixed behind an end segment at the hub end and an end segment at the rotor blade tip end. In each rotor blade segment, special reinforcing elements, which are arranged in the interior of the rotor blade, run parallel to the steel cables.

SUMMARY OF THE INVENTION

In view of the above, it is an object of the invention to provide a rotor blade or a rotor blade segment for a wind turbine which is particularly simply constructed and can be simply and stably fixed to a rotor hub or another rotor blade segment with at least one cable. It is also an object of the invention to provide a method for fixing such a rotor blade or rotor blade segment on a rotor hub or on a further rotor blade segment.

The rotor blade unit of the invention is for a wind turbine having a rotor hub. The rotor blade unit includes: a rotor blade; a cable configured to fix the rotor blade on the rotor hub; and, the cable having a section redirected in a U-shaped manner within the rotor blade.

The rotor blade or rotor blade segment has at least one cable for the fixation of the rotor blade or rotor blade segment on a rotor hub or on a further rotor blade segment, whereby the at least one cable is redirected inside the rotor blade or rotor blade segment in a U-shaped manner.

The at least one cable can, in particular, be made of steel but can also be made of plastic. It is constructed from a plurality of elements, in particular, a plurality of strands, which extend in the longitudinal direction of the cable. This results in a high tensile strength of the cable, which can, in particular, be higher than that of a massive bolt having the same cross-section.

The rotor blade or rotor blade segment can have a connecting area which, with the rotor blade or the rotor blade segment being mounted on a rotor hub or a further rotor blade segment, faces the rotor blade or the further rotor blade segment respectively. The connecting area can be directly adjacent a connecting area of the further rotor blade segment or adjoin a contact area, in particular, a flange of the rotor hub. Both ends of the cable can protrude from the connecting area, so that the rotor blade or rotor blade segment can be pulled toward the rotor hub or the further rotor blade segment by applying a tensile force to the ends of the cable. The connecting area can be planar.

In the invention, the at least one cable is redirected in a U-shaped manner inside the rotor blade or rotor blade segment. Redirected in a U-shaped manner means that two longitudinal sections of the cable adjoining the U-shape can essentially extend in a parallel direction, so that by applying a tensile stress to these longitudinal sections of the cable, the rotor blade or rotor blade segment can be tension held on a rotor hub or a further rotor blade segment. The U-shape can have two side sections which are arranged substantially parallel to each other and connect at a middle, curved base section interlinking the two side sections. The side sections can have any desired length, in particular, they can be very short. Sections of the cable connecting to the U-shape and/or the side sections of the U-shape can essentially extend in the longitudinal direction of the rotor blade or the rotor blade segment. The middle section may be semicircular, but may also have a geometry deviating therefrom which essentially moves through an arc having an angle of approximately 180°, for example, a straight-line section with two 90° arcs adjoining thereto or a parabolic or elliptical section. The U-shape can also essentially be reduced to such a middle, arc-shaped section and, for example, be exclusively made up of a semi-circle. An arc which runs over an angle of 180° is ideal for an optimal force transmission into the rotor blade or rotor blade segment. With a corresponding configuration, however, larger deviations from this angle are also possible.

The section redirected in a U-shaped manner of the at least one cable can be arranged within a connecting region which extends only over a longitudinal section of the rotor blade or rotor blade segment which adjoins the connecting area. The longitudinal section can extend only over a portion of the total length of the rotor blade or rotor blade segment, whereas an adjoining longitudinal section of the rotor blade or rotor blade segment contains no section of the cable. The at least one cable can be fixedly connected with the rotor blade or rotor blade segment in the section redirected in a U-shaped manner or be anchored therein or be movably arranged or guided therein. It is understood that the rotor blade or rotor blade segment can include several U-shaped redirected cables, in particular, arranged more or less evenly distributed over a periphery of the rotor blade or rotor blade segment.

As a result of the cable redirected in a U-shaped manner, a tensile stress applied on the cable can be extensively transmitted to the rotor blade or rotor blade segment without requiring more of an anchoring of the cable than the redirecting. Furthermore, the cable can, in the area of the U-shaped redirection and/or in adjoining longitudinal sections, i.e. in a relatively large longitudinal area, be guided freely movably through the rotor blade or rotor blade segment. Thus, a relatively high elasticity is achieved which favors a uniform pretensioning even under load. A further advantage is that the number of required tensioning actions can be reduced by half as compared to a straight-line cable connection because each of the at least one cables can be fixedly anchored at a first end, and a pre-tensioning must be performed only when fastening the other end.

In an embodiment, a U-shaped redirected section of the at least one cable runs at an essentially uniform distance from an outer surface of the rotor blade or rotor blade segment. The outer surface can, in particular, be an aerodynamic surface of the rotor blade segment or rotor blade, for example, a pressure side or suction side. In particular for the fixation on a rotor hub, the section redirected in a U-shaped manner can be arranged in an essentially cylindrical blade root region, and the outer surface can be a cylinder-jacket-shaped surface close to the blade root. The arrangement of the section redirected in a U-shaped manner or of the entire cable at a uniform distance from an outer surface is advantageous in terms of strength.

In an embodiment, the rotor blade or rotor blade segment has a U-shaped cable duct through which the at least one cable is guided. Principally, the U-shaped redirection of the at least one cable can also be done independently of a cable duct, for example, by directly embedding the at least one cable in a wall of the rotor blade or rotor blade segment or by arranging the at least one cable in a U-shaped channel arranged in the wall or any other free space. It is also conceivable to arrange another anchoring element in the rotor blade or rotor blade segment, about which the at least one cable is guided in U-shape manner. Such an anchoring element can, for example, be a cylindrical metal component, for example, with a semicircular footprint, which is arranged or embedded in a wall of the rotor blade or rotor blade segment transversely to the longitudinal direction of the rotor blade or rotor blade segment. When using a U-shaped cable duct, it can be fixedly connected to the rotor blade or rotor blade segment, for example, by adhesive bonding. It is a guide for the at least one cable. The cable duct can, for example, be made of steel, but can also be made of another metal or plastic. The two ends of the cable duct can be flush with a connecting surface of the rotor blade or rotor blade segment. The use of a cable duct favors a uniform force transmission into the rotor blade or rotor blade segment, in particular, when the latter is made of a fiber-reinforced plastic. Further, it ensures a desired U-shaped course of the at least one cable and simplifies the mounting of the cable. Thereby, the cable can be inserted into the cable duct after the completion of all other components of the rotor blade or rotor blade segment.

In an embodiment, the U-shaped cable duct is embedded in a wall of the rotor blade or rotor blade segment. The wall can be reinforced in the area of the cable duct, in particular, by a thickening toward the inside of the rotor blade or rotor blade segment. Such a reinforcement, however, is not necessarily required. By embedding the cable duct, a particularly large-scale and uniform force transmission into the rotor blade or rotor blade segment is achieved.

In an embodiment, the rotor blade or rotor blade segment has a plastic material with a yield point, and the at least one cable is configured to exercise a predetermined pre-tensioning in a state in which the rotor blade or rotor blade segment is fixed to the rotor hub or further rotor blade segment, in which connection the contact surfaces of the plastic material of the rotor blade or rotor blade segment are, in the area in which the at least one cable is redirected in a U-shaped manner, dimensioned such that the surface pressing exerted by the pre-tensioned at least one cable according to the construction does not exceed the yield point of the plastic material. The force to be applied per unit of area which effects a plastic deformation of the plastic material is referred to as the yield point. In particular, the plastic material can be a fiber-reinforced plastic. The contact surfaces can be surfaces of the plastic material, which either coact directly with the cable or coact with the at least one cable via a body serving as an anchor. In particular, the contact surfaces can adjoin outer surfaces of the cable duct. The surface pressure applied to the contact surfaces by the cable is dependent on the geometry of the contact surfaces, in particular, on the shape and width of the U-shaped section of the cable or on the cable duct surrounding the cable as well as on the intended pre-tensioning. Matching of these parameters in such a manner that the yield point is not exceeded provides the important advantage that the defined pre-tensioning is reliably maintained even over long periods of time. Due to this, maintenance work for the purpose of checking the pre-tensioning, as may be required in conventional bolt couplings, is made unnecessary. When matching the cited parameters a dynamic load which causes a tensioning in excess of the pre-tensioning must be considered.

In an embodiment, at least one end of the cable has a cable end sleeve. The cable end sleeve enables a fixation of the cable end on a rotor hub or a further rotor blade segment. Principally, the ends of the cable can be fixed in any desired way, for example, by a grommet, a Flemish eye or another splice connection, or by a cable lock. The fixation with a cable end sleeve can be configured especially compact. The cable end sleeve can be a clamped-on cable ferrule or a molded cable end sleeve. A thread can be formed on the cable end sleeve so that the cable end sleeve can, for example, be guided through a through-bore in an anchoring element or in a flange of a rotor hub and be fixed at the back side thereof by means of a nut and, where applicable, be pre-tensioned. In this manner, a particularly simple fixation of the respective cable end is achieved.

In an embodiment, the rotor blade or rotor blade segment described above is part of a system to which also a rotor hub belongs, and both ends of the at least one cable are anchored in or to the rotor hub. In this manner, the rotor blade or the rotor blade segment and the rotor hub are connected to each other via at least one cable. It is understood that several cables can be used which are each redirected in a U-shaped manner in the rotor blade or rotor blade segment, in particular, in an arrangement approximately evenly distributed over the periphery of the rotor blade or rotor blade segment.

In an embodiment, the rotor blade or rotor blade segment described above is part of a system to which also a rotor hub belongs, whereby the at least one cable is redirected in a U-shaped manner in or at the rotor hub, and a first end of the at least one cable is anchored in the rotor blade or rotor blade segment, and a second end of the at least one cable is anchored in or at the rotor hub. In particular, the redirection in or on the rotor hub can be done as described in detail above in regards to the U-shaped redirection in the rotor blade or rotor blade segment. The two U-shaped sections of the at least one cable are arranged opposite one another in an offset manner in the two connected components, in particular, in such a manner that one side section of the first U-shaped section passes into a second side section of the second U-shaped section, especially in a straight line. In other words, the two U-shaped sections are arranged essentially S-shaped. Because of the double, U-shaped redirection of the at least one cable the number of necessary tensioning processes is further reduced, since the at least one cable can simultaneously pull the two components together at three spaced locations and apply the defined pre-tensioning at the same time. Further, the uniformity of the applied pre-tensioning can be optimized, as long as the occurring frictional forces between the at least one cable and the adjoining contact surfaces, in particular, of the cable duct are kept sufficiently small.

In an embodiment, the rotor blade or rotor blade segment described above is part of a system which includes a rotor hub, whereby the at least one cable is likewise redirected in a U-shaped manner in or at the rotor hub and is redirected twice in a U-shaped manner in the rotor blade or rotor blade segment or in or at the rotor hub, and both ends of the at least one cable are anchored in the rotor blade or rotor blade segment or in or at the rotor hub. In this embodiment, the at least one cable runs in a "serpentine-like" manner, whereby overall three U-shaped sections are provided. The first and third U-shaped sections along the cable are arranged in one of the two interconnected components, while the second, middle U-shaped section is arranged in the other component. The two side sections of the second, middle U-shaped section can each pass into a side section of one of the first and third U-shaped sections, in particular, in a straight line. The U-shaped sections are arranged opposite and offset from each other. The two ends of the cable are fixed in that component in which also the second, middle U-shaped redirection of the cable occurs. By this serpentine-like arrangement of the cable the number of necessary pre-tensioning processes can be further reduced.

In an embodiment, the rotor blade segment described above is part of a system which also includes a further rotor blade segment, wherein both ends of the cable are anchored in the further rotor blade segment. In this way, the two rotor blade segments of the system are fixedly interconnected.

In an embodiment, the rotor blade segment described above is part of a system which has a further rotor blade segment, wherein the at least one cable is also redirected in a U-shaped manner in the further rotor blade segment, and a first end of the at least one cable is anchored in the rotor blade segment, and a second end of the at least one rope is anchored in the further rotor blade segment. The redirection in the further rotor blade segment can, in particular, be configured such as has been described in detail above in regard to the U-shaped redirection in the rotor blade segment.

In an embodiment, the rotor blade segment described above is part of a system which has a further rotor blade segment, wherein the at least one cable is also redirected in a U-shaped manner in the further rotor blade segment, and the at least one cable is redirected in a U-shaped manner twice in the rotor blade segment or in the further rotor blade segment, and both ends of the at least one cable are anchored in the rotor blade segment or in the further rotor blade segment. In this embodiment, the at least one cable again takes on a serpentine-like configuration. Reference is made to the explanations given above with respect thereto.

The object given above is also solved by a method for fixing a rotor blade or rotor blade segment on a rotor hub or on a further rotor blade segment.

The method according to the invention includes the following steps:
providing a rotor blade or a rotor blade segment with the features of one of the configurations described above,
providing a rotor hub or a further rotor blade segment, on which the rotor blade or the rotor blade segment is to be fixed,
arranging a rotor blade or a rotor blade segment and rotor hub or further rotor blade segment in a designated mounting position,
anchoring a first end of the at least one cable in the rotor blade or rotor blade segment or in or on the rotor hub or the further rotor blade segment,
anchoring a second end of the at least one cable in the rotor blade or rotor blade segment or in or on the rotor hub or further rotor blade segment.

The cited feature alternatives include the following steps:
fixing a rotor blade on a rotor hub,
fixing a rotor blade segment on a rotor hub, or
fixing a rotor blade segment on a further rotor blade segment.

For each of these method alternatives the fixing process and the rotor blade or rotor blade segment according to the invention can be utilized in a useful way. The result of the method is a system of two components fixedly interconnected by the at least one cable. In regard to the method features and the advantages of the method, reference is made to the above illustrations regarding the rotor blade or rotor blade segment.

In an embodiment, a defined pre-tensioning is generated when anchoring the second end of the at least one cable in a first step, and fixation of the second end of the at least one cable is performed in a second step. The defined pre-tensioning can be generated by a tensioning tool, in particular, a hydraulic tensioning tool. Fixing the second end can, for example, be done by screwing a nut onto a threaded cable end sleeve. What is particularly advantageous in this process is that only a single tensioning process is required for the pre-tensioning of two cable sections bridging a connection point between the two components.

In an embodiment, the at least one cable is redirected in a U-shaped manner in or at the rotor hub or the further rotor blade segment. For example, for this purpose, the at least one cable can be guided through a U-shaped cable duct or any other guide which is formed at the rotor hub or in the further rotor blade segment. In this way, the at least one cable can span a connection point between the two components three times, whereby where applicable, again only a single pre-tensioning process for the application of the pre-tensioning on all three connection points is necessary. It is understood that this embodiment as well as the above described embodiments of the method according to the invention can be implemented, in particular, in connection with one of the above described systems of a rotor blade or rotor blade segment and a further component.

BRIEF DESCRIPTION OF THE DRAWINGS

The invention will now be described with reference to the drawings wherein.

Identical or corresponding parts are provided with the same reference characters in all figures.

DESCRIPTION OF THE PREFERRED
EMBODIMENTS OF THE INVENTION

Figure 1:
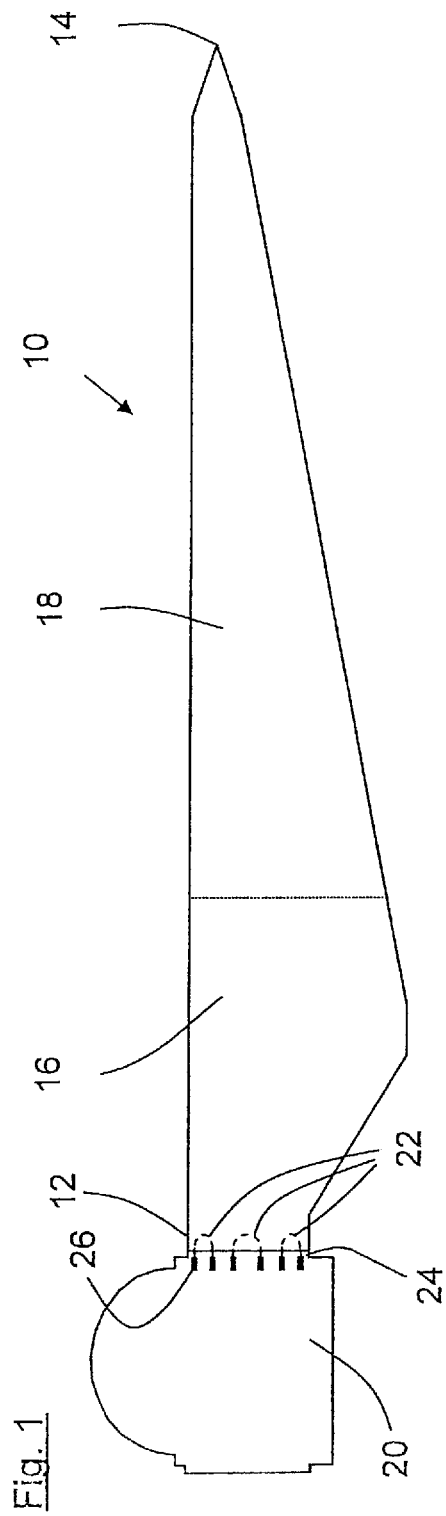
FIG. 1 shows a system according to the invention having a rotor blade comprising two rotor blade segments and a rotor hub.

The rotor blade 10 shown in FIG. 1 has a blade root 12 and a blade tip 14 and is composed of two rotor blade segments (16, 18). The rotor blade segment 16 extends from the blade root 12 over approximately one third of the length of the rotor blade 10. The rotor blade segment 18 extends over approximately the remaining two thirds of the rotor blade length to the blade tip 14.

The blade root 12 is fixed to a rotor hub 20. For this, a plurality of steel cables 22, shown in broken lines, are provided. Each steel cable is redirected in a U-shaped manner in a section of the rotor blade segment 16 arranged close to the blade root 12, so that the two ends of each cable point in the direction of a flange 24 (shown only roughly) of the rotor hub 20. Each end of each of the cables 22 extends through a bore-hole (not shown) in the flange 24 of the rotor hub 20 and is anchored behind it by a retaining element 26. Each one of the cables 22 exerts a defined pre-tensioning. The two rotor blade segments (16, 18) of the rotor blade 10 are also connected to each other via several cables, which, however, is not shown in FIG. 1.

Figure 2:
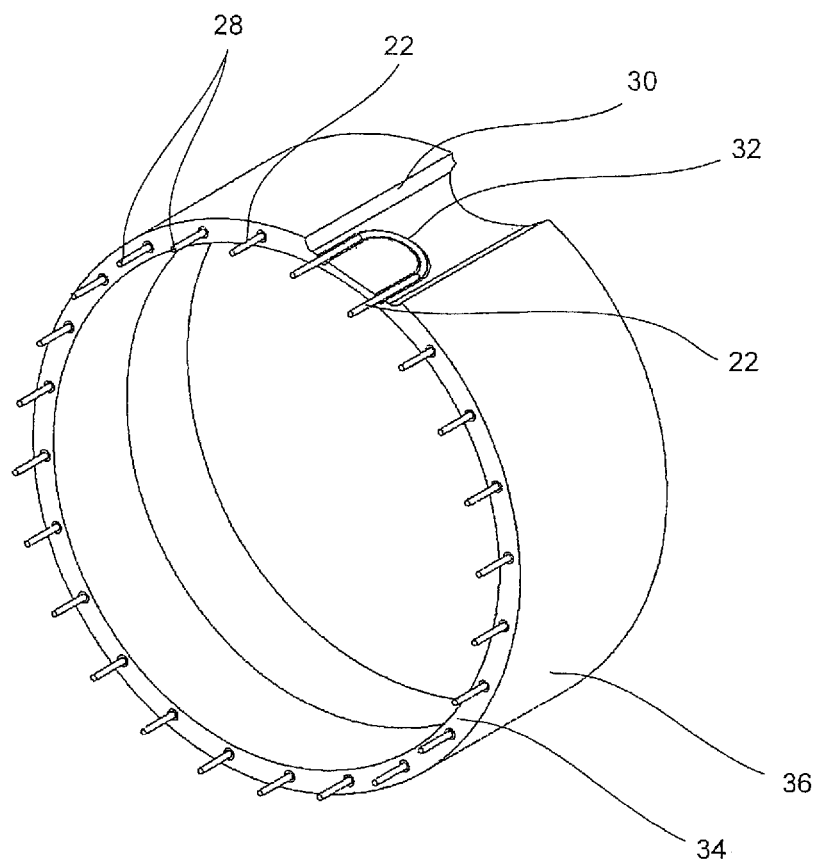
FIG. 2 shows a partially cut, perspective view of the blade root area of a rotor blade according to the invention.

FIG. 2 shows a perspective view of the end on the blade root side of a rotor blade according to the invention. The rotor blade has a plurality of cables 22 of which in FIG. 2, with the exception of a cable 22 shown above, essentially the ends 28 protruding out of the rotor blade can be seen. In each case, two of the ends 28 belong to one cable 22, which is redirected in a U-shaped manner in the interior of a wall 30 of the rotor blade.

For the purpose of illustration, in the vicinity of the cable 22 shown at the top, the material of the wall 30 is shown partially cut away, so that a U-shaped section 32 of the cable 22 can be seen.

The blade root of the rotor blade shown in FIG. 2 has an annularly-shaped connecting area 34 which, in the mounted state, adjoins a flange 24 of the rotor hub 20. Furthermore, the blade root area of the shown rotor blade is essentially circular-cylindrical with a circular-cylindrical jacket-shaped outer surface 36. The cables 22, in particular, the sections 32 redirected in a U-shaped manner run at a uniform distance from this outer surface 36. All of the ends 28 of the cables 22 protruding from the connecting area 34 have an even distance from one another. The width of the sections 32 redirected in a U-shaped manner thus corresponds to the distance which is formed between two adjacent ends of two cables redirected in a U-shaped manner.

Figure 3:
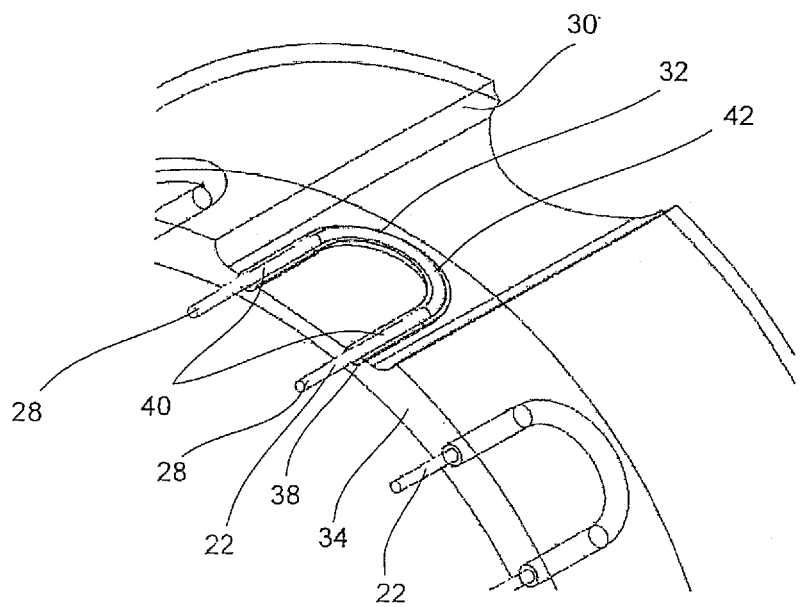
FIG. 3 shows a cutaway section from FIG. 2.

Further details of the cable 22 redirected in a U-shaped manner can be clearly seen in FIG. 3, which in part also shows hidden lines. The U-shaped course of the cable 22 with side sections 40 which are arranged essentially in parallel and run in the longitudinal direction of the rotor blade can be clearly seen. The side sections 40 transition into a middle, arc-shaped section 42 of the section 32 redirected in a U-shaped manner. The arc-shaped section 42 runs over an angle of 180°.

The cable 22 is guided through a U-shaped cable duct 38 which is embedded in the wall 30. The embedding is done by laminating the cable duct 38, which in the example is made of steel, into the fiber-reinforced plastic material of the wall 30. The two ends of the U-shaped cable duct 38 are flush with the connecting area 34 of the rotor blade.

Figure 4:
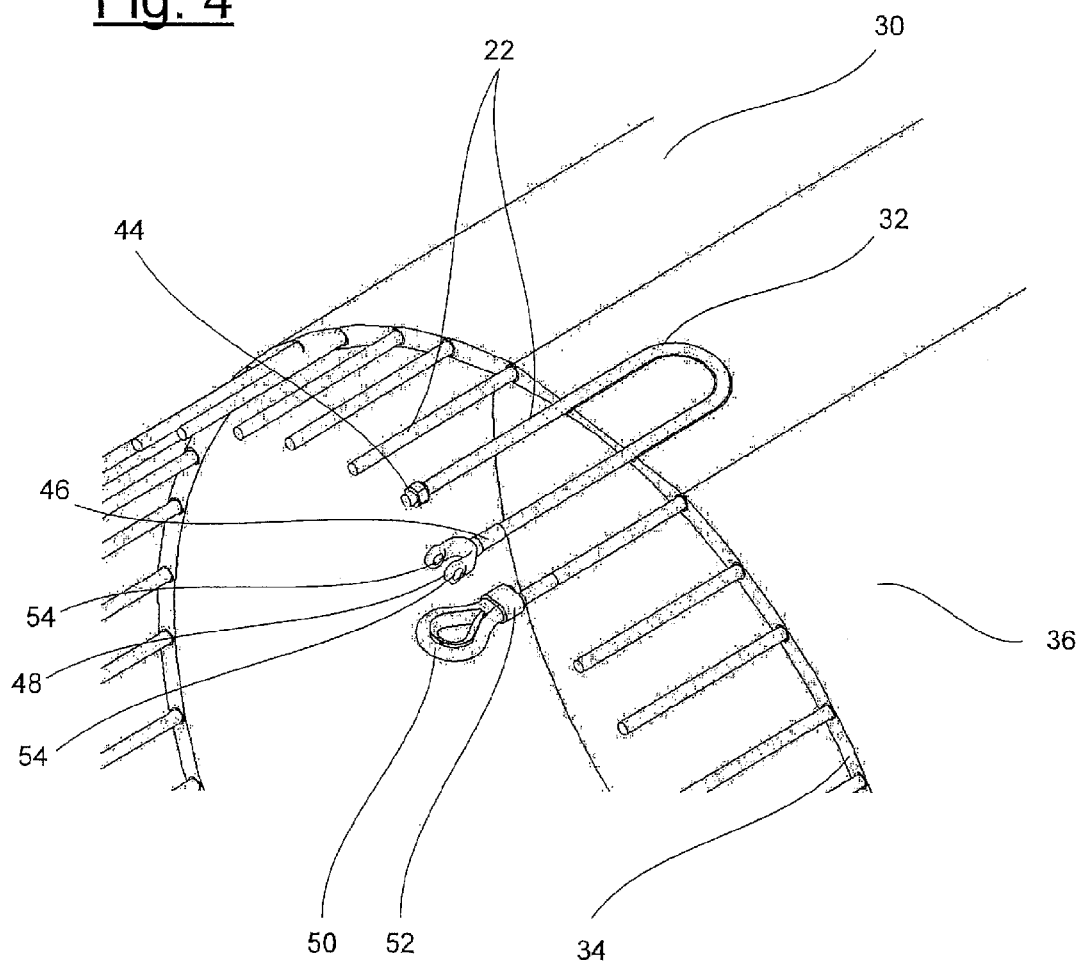
FIG. 4 shows the blade root area of a rotor blade according to the invention with exemplary cable fasteners.

FIG. 4 shows a further embodiment in a perspective view, in which the wall 30 of an area near the blade root of the shown rotor blade is again shown partially cut away, in order to illustrate the U-shaped course of one of the cables 22. Compared to the embodiments of FIGS. 2 and 3, the thin wall thickness of the wall 30 is conspicuous. The wall thickness is only slightly greater than the diameter of the utilized cables 22, for example, by less than half the diameter. FIG. 4 particularly serves to illustrate different cable connectors. The cable 22 shown at the top is connected to a cable end sleeve, not shown in FIG. 4, for example, by casting, whereby the cable end sleeve has a thread on which a nut 44 is arranged.

The other end of the cable 22 shown on the right also has a cable end sleeve 46 which transitions into a fork-shaped-opening fixation section 48 with mutually opposite-lying fixation bores 54.

A further possibility of a cable end connection shown in FIG. 4 on the right is a grommet 50 with a ferrule 52.

Figure 7:
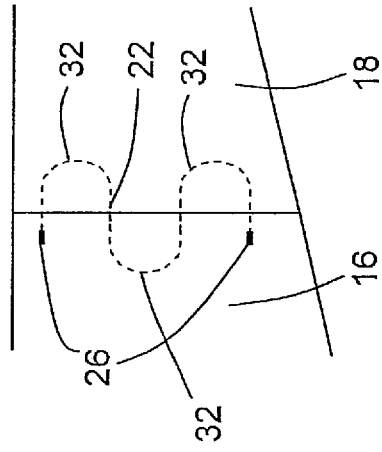
Figure 6:
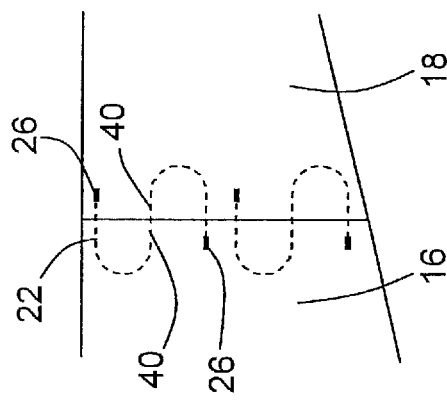
FIG. 6 shows a different connecting area of two rotor blade segments in a schematic view; and, FIG. 7 shows a further connecting area of two rotor blade segments in a schematic view.
Figure 5:
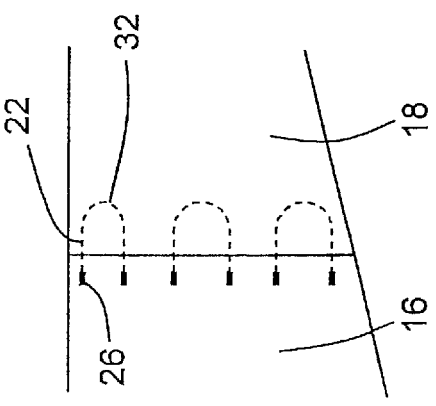
FIG. 5 shows a connecting area of two interconnected rotor blade segments in a schematic view.

In view of the connection of two rotor blade segments (16, 18), FIGS. 5 to 7 show different embodiments of the invention. In the example of FIG. 5, three cables 22 redirected in a U-shaped manner are shown, whose sections 32 redirected in a U-shaped manner are each located within the blade-tip-end rotor blade segment 18. The two ends of each cable 22 are anchored with a retaining element 26 each in the blade-root-end rotor blade segment 16.

FIG. 6 shows cables 22 arranged in an S-shaped manner. Each of the cables 22 is redirected in a U-shaped manner once in the rotor blade segment 16 and once in the rotor blade segment 18. The side sections 40, which face each other, transition into each other linearly. A first end of each of the two cables 22 is anchored in the rotor blade segment 16 with a retaining element 26; a second end of each of the cables 22 is anchored in the rotor blade segment 18, also with a retaining element 26.

FIG. 7 shows a serpentine-like configured cable 22 which has a centrally disposed section 32 redirected in a U-shaped manner in the rotor blade segment 16, and two adjoining sections 32 which are redirected in a U-shaped manner and arranged in the rotor blade segment 18. Both ends of the cable 22 are anchored in the rotor blade segment 16 each by a retaining element 26.

It is understood that the foregoing description is that of the preferred embodiments of the invention and that various changes and modifications may be made thereto without departing from the spirit and scope of the invention as defined in the appended claims.

What is claimed is:

1. A rotor blade unit for a wind turbine having a rotor hub, the rotor blade unit comprising:
   a rotor blade;
   a cable configured to fix said rotor blade on the rotor hub; and,
   said cable having a section redirected in a U-shaped manner within said rotor blade.

2. The rotor blade unit of claim 1, wherein said rotor blade defines an outer surface; and, said U-shaped section of said cable runs in said rotor blade at a uniform distance from said surface.

3. The rotor blade unit of claim 1, wherein said rotor blade includes a U-shaped cable duct through which said cable runs.

4. The rotor blade unit of claim 3, wherein said rotor blade has a wall; and, said U-shaped cable duct is embedded in said wall.

5. The rotor blade unit of claim 1, wherein:
   said rotor blade is made of a plastic material having a yield point;
   said cable is configured to apply a predetermined pre-tensioning in the mounted state of said rotor blade on said rotor hub;
   said plastic material of said rotor blade has contact surfaces in the area in which said cable is redirected in a U-shaped manner; and,
   said contact surfaces are so dimensioned that the surface pressure applied by said cable does not cause said yield point of said plastic material to be exceeded.

6. The rotor blade unit of claim 1, wherein said cable has ends and at least one of said ends of said cable has a cable end sleeve.

7. A rotor blade unit for a wind turbine having a rotor hub, the rotor blade unit comprising:
a first rotor blade segment;
a second rotor blade segment;
said first and second rotor blade segments conjointly defining an interface;
a first cable configured to attach said rotor blade segments to each other at said interface;
said first cable having a section redirected in a U-shaped manner within at least one of said rotor blade segments;
a second cable configured to attach said first rotor blade segment to the rotor hub; and,
said second cable being redirected in a U-shaped manner within said first rotor blade segment.

8. The rotor blade unit of claim 7, wherein each of said rotor blade segments defines an outer surface; and, each of said U-shaped sections of said cables runs in the rotor blade segment corresponding thereto at a uniform distance from said surface.

9. The rotor blade unit of claim 7, wherein said first and second rotor blade segments include first and second U-shaped cable ducts, respectively, through which corresponding ones of said first and second cables run.

10. The rotor blade unit of claim 9, wherein said rotor blade segments have respective walls; and, said U-shaped cable ducts are embedded in corresponding ones of said walls.

11. The rotor blade unit of claim 7, wherein:
said rotor blade segments are made of a plastic material having a yield point;
said first cable is configured to apply a predetermined pre-tensioning to hold said first and second rotor blade segments together at said interface;
said second cable is configured to apply a predetermined pre-tensioning in the mounted state of said first rotor blade segment on said rotor hub;
said plastic material of said first and second rotor blade segments defines respective contact surfaces in the areas in which corresponding ones of said first and second cables are redirected in a U-shaped manner; and,
said contact surfaces are so dimensioned that the surface pressure applied by said first and second cables does not exceed said yield point of said plastic material.

12. The rotor blade unit of claim 7, wherein each of said first and second cables has ends and at least one of said ends of each of said cables has a cable end sleeve.

13. A rotor blade for a wind turbine, the rotor blade comprising:
a first rotor blade segment;
a second rotor blade segment;
said first and second rotor blade segments conjointly defining an interface;
a cable configured to attach said rotor blade segments to each other at said interface;
said cable having a first end, a second end and a middle section arranged between said first end and said second end;
said middle section being redirected in a U-shaped manner within a first one of said rotor blade segments; and,
said first and said second ends being anchored in the second one of said rotor blade segments.

14. The rotor blade of claim 13, wherein each of said rotor blade segments defines an outer surface; and, said U-shaped section of said cable runs in the rotor blade segment corresponding thereto at a uniform distance from said surface.

15. The rotor blade of claim 13, wherein said first one of said rotor blade segments includes a U-shaped cable duct through which said cable runs.

16. The rotor blade of claim 15, wherein said first one of said rotor blade segments has a wall; and, said U-shaped cable duct is embedded in said wall.

17. The rotor blade of claim 13, wherein:
said rotor blade segments are made of a plastic material having a yield point;
said cable is configured to apply a predetermined pre-tensioning to hold said first and second rotor blade segments together at said interface;
said plastic material of at least one of said first and second rotor blade segments defines a contact surface in the area in which said cable is redirected in a U-shaped manner; and,
said contact surface is so dimensioned that the surface pressure applied by said cable does not exceed said yield point of said plastic material.

18. The rotor blade of claim 13, wherein at least one of said first end and said second end of said cable has a cable end sleeve.

19. A rotor blade assembly for a wind turbine, the rotor blade assembly comprising:
a rotor hub;
a rotor blade;
a cable having two ends;
said cable being configured to fix said rotor blade on said rotor hub;
said cable being redirected in a U-shaped manner inside said rotor blade; and,
said two ends of said cable being anchored in or on said rotor hub.

20. A rotor blade assembly for a wind turbine, the rotor blade assembly comprising:
a rotor hub;
a rotor blade;
a cable having first and second ends;
said cable being configured to fix said rotor blade on said rotor hub;
said cable being redirected in a U-shaped manner inside said rotor blade;
said cable also being redirected in a U-shaped manner in or on said rotor hub;
said first end of said cable being anchored in said rotor blade; and,
said second end of said cable being anchored in or on said rotor hub.

21. A rotor blade assembly for a wind turbine, the rotor blade assembly comprising:
a rotor hub;
a rotor blade;
a cable having first and second ends;
said cable being configured to fix said rotor blade on said rotor hub;
said cable being redirected in a U-shaped manner inside said rotor blade;
said cable also being redirected in a U-shaped manner in or on said rotor hub;
said cable being redirected in a U-shaped manner twice in one of said rotor blade and said rotor hub; and,
said first and second ends of said cable being anchored in or on the other one of said rotor blade and said rotor hub.

22. A rotor blade assembly for a wind turbine, the rotor blade assembly comprising:
a rotor hub;
a first rotor blade segment;

a second rotor blade segment;
a cable having first and second ends and a middle section arranged between said first end and said second end;
said cable being configured to fix said first rotor blade segment on said second rotor blade segment;
said middle section being redirected in a U-shaped manner inside said first rotor blade segment; and,
said first and said second ends of said cable being anchored in said second rotor blade segment.

23. A rotor blade assembly for a wind turbine, the rotor blade assembly comprising:
a first rotor blade segment;
a second rotor blade segment;
a cable configured to fix said first rotor blade segment to said second rotor blade segment;
said cable having a first end, a second end and a middle section arranged between said first end and said second end;
said middle section being redirected in U-shaped manner in each of said first and second rotor blade segments; and,
said first end being anchored in said first rotor blade segment and said second end being anchored in said second rotor blade segment.

24. A rotor blade assembly for a wind turbine, the rotor blade assembly comprising:
a first rotor blade segment;
a second rotor blade segment;
a cable configured to fix said first rotor blade segment to said second rotor blade segment;
said cable being redirected in U-shaped manner in each of said first and second rotor blade segments;
said cable being redirected twice in one of said first and second rotor blade segments; and,
said cable having first and second ends anchored in the other one of said first and second rotor blade segments.

25. A method for fixing a rotor blade on a rotor hub of a wind turbine, said method comprising the steps of:
providing the rotor blade with a cable with first and second ends with said cable being configured to fix said rotor blade on the rotor hub; and, said cable being redirected in a U-shaped manner within said rotor blade;
providing the rotor hub on which said rotor blade is to be fixed;
arranging said rotor blade and said rotor hub in a designated mounting position;
anchoring said first end of said cable in said rotor blade or in or on said rotor hub; and,
anchoring said second end of said cable in the rotor blade or in or on said rotor hub.

26. The method of claim 25, wherein said second end of said cable is anchored with the following steps:
generating a defined pretensioning when anchoring said second end of said cable; and,
fixing said second end of said cable to one of said rotor blade and said rotor hub.

27. The method of claim 25, wherein said cable is redirected in a U-shaped manner in or on the rotor hub.

28. A method for fixing a rotor blade on a rotor hub of a wind turbine, the rotor blade including first and second rotor blade segments, said method comprising the steps of:
providing said first rotor blade segment having a first cable having first and second ends with said first cable being configured to fix said first rotor blade segment on the rotor hub; and, said first cable being redirected in a U-shaped manner within said first rotor blade segment;
providing the rotor hub on which said first rotor blade segment is to be fixed;
providing said second rotor blade segment having a second cable having first and second ends with said second cable being configured to fix said second rotor blade segment on the first rotor blade segment; and, said second cable being redirected in a U-shaped manner within at least one of said first and second rotor blade segments;
arranging said first and second rotor blade segments and said rotor hub in a designated mounting position;
anchoring said first end of said first cable in said first rotor blade segment or in or on said rotor hub;
anchoring said second end of said first cable in said first rotor blade segment or in or on said rotor hub;
anchoring said first end of said second cable in said first rotor blade segment or in said second rotor blade segment; and,
anchoring said second end of said second cable in said first rotor blade segment or in said second rotor blade segment.

29. The method of claim 28, wherein said second ends of said first and second cables are anchored with the following steps:
generating a defined pretensioning when anchoring said second end of said first cable;
fixing said second end of said first cable to one of said first rotor blade segment and said rotor hub;
generating a defined pretensioning when anchoring said second end of said second cable; and,
fixing said second end of said second cable in one of said first and second rotor blade segments.

30. The method of claim 28, wherein said first cable is redirected in a U-shaped manner in or on the rotor hub.

31. A method for fixing a first rotor blade segment of a wind turbine on a second rotor blade segment, said method comprising the steps of:
providing the first rotor blade segment with a cable with first and second ends with said cable being configured to fix the first rotor blade segment on the second rotor blade segment; said cable having a middle section arranged between said first end and said second end; and, said middle section being redirected in a U-shaped manner within one of said rotor blade segments;
providing the second rotor blade segment on which said first rotor blade segment is to be fixed;
arranging said first rotor blade segment and said second rotor blade segment in a designated mounting position;
anchoring said first end of said cable in said first or second rotor blade segment; and,
anchoring said second end of said cable in said first or second rotor blade segment.

32. The method of claim 31, wherein said second end of said cable is anchored with the following steps:
generating a defined pretensioning when anchoring said second end of said cable; and,
fixing said second end of said cable to one of said first rotor blade segment and said second rotor blade segment.

* * * * *